United States Patent [19]

Link

[11] Patent Number: 4,563,925

[45] Date of Patent: Jan. 14, 1986

[54] MULTISPINDLE-AUTOMATIC TURRET LATHE

[75] Inventor: Helmut F. Link, Aichwald, Fed. Rep. of Germany

[73] Assignee: Index-Werke Konn.-Ges. Hahn & Tessky, Esslingen, Fed. Rep. of Germany

[21] Appl. No.: 488,746

[22] Filed: Apr. 26, 1983

[30] Foreign Application Priority Data

May 6, 1982 [DE] Fed. Rep. of Germany ....... 3216891

[51] Int. Cl.⁴ ................. B23B 19/02; B23B 13/02
[52] U.S. Cl. ...................... 82/28 R; 82/2.7; 29/568
[58] Field of Search .......... 82/2.5, 2.7, 28 R, 15, 82/2 R, 2 B, 28 B; 408/35; 29/40, 53, 568; 82/36 A

[56] References Cited

U.S. PATENT DOCUMENTS

| | | | |
|---|---|---|---|
| 3,371,564 | 3/1968 | Schubert et al. | 82/3 |
| 3,587,369 | 6/1971 | Reiners et al. | 82/2.5 |
| 3,750,244 | 8/1973 | Smith | 408/35 |
| 3,762,035 | 10/1973 | Ledergerber et al. | 408/35 |
| 3,984,905 | 10/1976 | Petzoldt | 82/36 A |
| 4,019,410 | 4/1977 | Staszkiewicz | 82/3 |
| 4,358,228 | 11/1982 | Stark | 408/35 |

FOREIGN PATENT DOCUMENTS 0046883 3/1982 European Pat. Off. .
1075739 7/1967 United Kingdom ............ 82/2.5

Primary Examiner—Leonidas Vlachos
Attorney, Agent, or Firm—Shenier & O'Connor

[57] ABSTRACT

Multispindle-automatic turret lathe with a spindle support mounted for rotation about a central indexing axis on a headstock and in which are mounted several workspindles, and with a main driving motor for a drive shaft which is adapted to be drivingly coupled with that workspindle which at any given time occupies the working position.

Since it is regular custom to provide such main driving motors with electronic control units which not only control acceleration and deceleration of the workspindle which happens to be driven at any given time but which also allow the latter being stopped precisely in a clearly predefined angular position, a separate drive for the spindle support may be dispensed with by coupling the spindle support with the main driving motor for its intermittent indexing rotation movement.

6 Claims, 5 Drawing Figures

MULTISPINDLE-AUTOMATIC TURRET LATHE

The invention relates to a multi-spindle automatic turret lathe comprising a spindle support mounted on a headstock for rotation about a central indexing axis and a plurality of work spindles each defining one indexing position being mounted in said spindle support, and a main driving motor for a drive shaft which is adapted to be drivingly engaged with the respective workspindle occupying the working position.

Multispindle-automatic turret lathes of this kind are known (German AS 23 38 207 and German AS 21 59 552). In these known machines the intermittent indexing drive of the spindle support from one indexing station to the next is transmitted via complex transmission gear (Maltese-cross transmission and roller levers) from a separate motor (see for instance FIG. 4 of German AS 23 38 207).

In automatic turret lathes of the kind here under consideration the main driving motor for the workspindle or spindles is associated with an electronic control-system which not only controls the acceleration and deceleration of the respective driven workspindle but which also enables the latter to be stopped dead precisely in a predetermined angular position.

This circumstance is favourably utilised by the present invention which sets out to simplify the known automatic turret lathes of the kind specified. According to the invention the constructional arrangement is such that for intermittent indexing rotation of the spindle support the latter is adapted to be drivingly coupled with the main motor, that is to say, that the spindle support is switched on with the aid of the main motor. The electronic control system associated with the latter, which would be required in any case, thus, without additional outlay, enables the spindle support to be precisely positioned and to be accelerated and decelerated for indexing rotation in accordance with programme. Thanks to the present invention the conventional multispindle automatic turret lathes were not only considerably simplified but it was also possible to achieve shorter switching time for the spindle support inasmuch as the high output performance of the main driving motor is available for the switching operation.

The main driving motor could drive the spindle support through a separate branch of transmission gear, but the whole machine construction becomes particularly simple if the drive shaft which is separated from the workspindles is coupled with the spindle support, the arrangement being conveniently such that for driving engagement with or disengagement from the respective workspindle occupying the working position the drive shaft is slidingly displaceable in the longitudinal direction between an engaged and a disengaged position and carries a driving pinion which is in mesh—in the disengaged position—with a gearing associated with the spindle support. In other words, when the drive shaft is disengaged from a workspindle it is automatically coupled to the spindle support and corresponding conditions apply in regard to the reverse process.

A particularly simple and safe manner of arresting the spindle support in a given indexing position on the headstock may be achieved by producing gearings on the latter and on the spindle support which gearings are adapted to be mutually connected by means of a coupling gear which can be lifted off at least one of the two gearings, and by providing a controllable actuating device for said coupling gear. For this actuating device the use of hydraulic or pneumatic cylinders is particularly recommended.

In view of the fact that during an indexing movement the spindle support is always phase-locked to the drive shaft it would be conceivable to feed the respective indexing position of the spindle support into the central control system through a pick-up of rotation angle which is already provided on the machine and phase-locked to the drive shaft. However, monitoring of the respective spindle support position is rendered much simpler by the provision-known per se—of a first pick-up which is phase-locked to the drive shaft and a further, second pick-up which is phase-locked to the spindle support.

Further aspects, advantages and details of the invention arise from the attached claims and/or from the following description and accompanying drawings which illustrate a preferred embodiment of the invention and in which:

Figure 1:
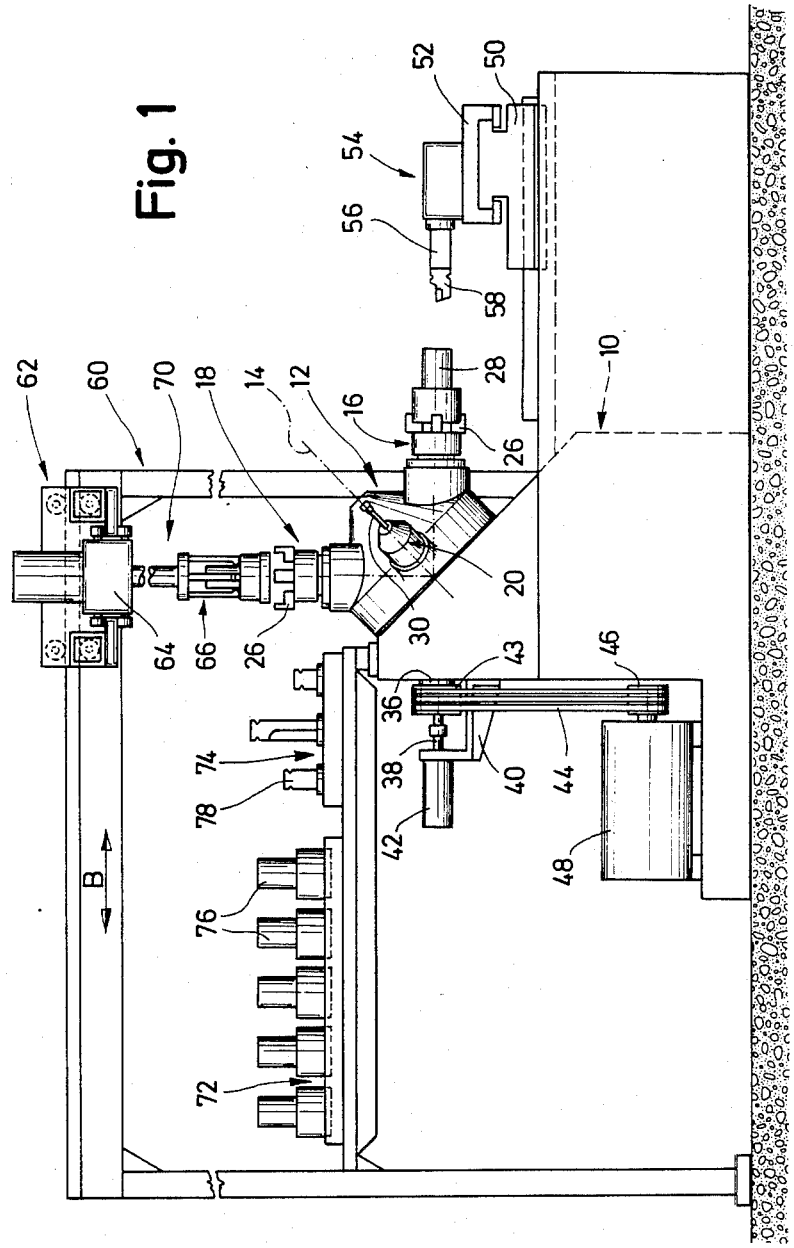
FIG. 1 is a lateral view of the multispindle-automatic turret lathe according to this invention.
Figure 2:
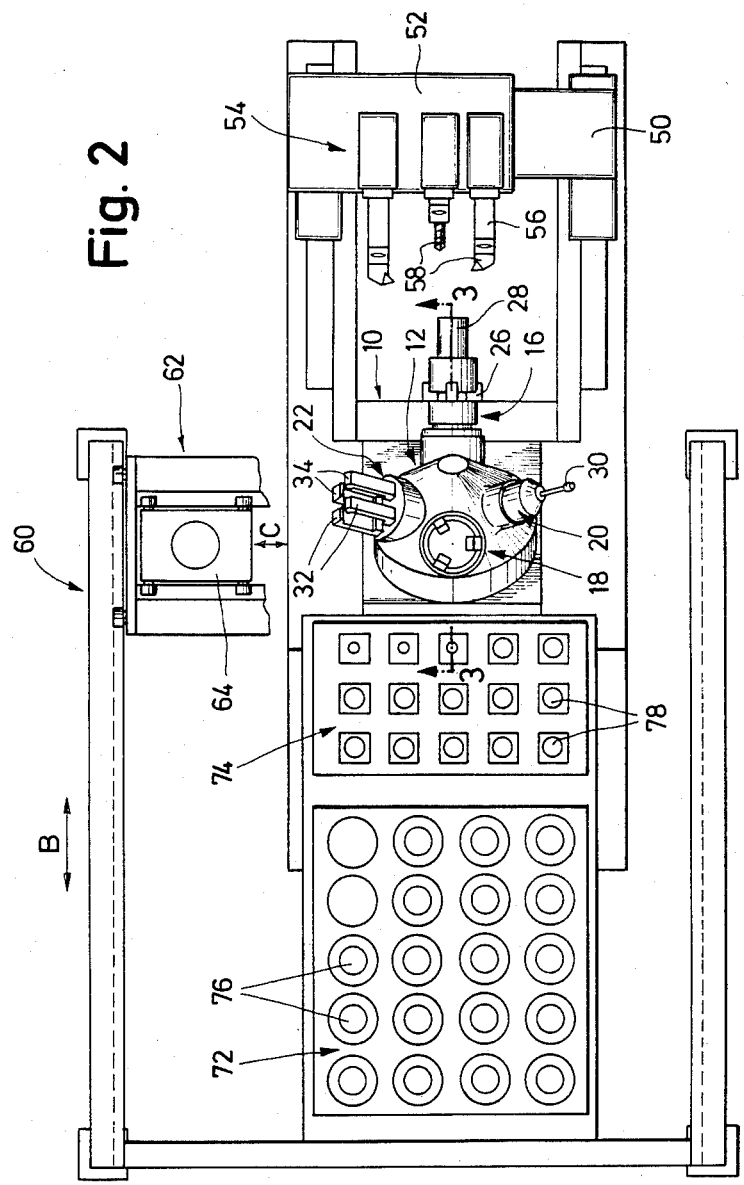
FIG 2 is a top view of the said automatic lathe.

The general construction of a multispindle-automatic turning lathe according to this invention will be first of all explained in principle with reference to FIGS. 1 and 2.

A spindle support 12 is mounted on a headstock 10 for rotation about an indexing axis 14 which is inclined, preferably at an angle of 45°, relative to the horizontal. This spindle support is equipped with two workspindles 16 and 18, one measuring station 20 and one gripper station 22, the axes of the two workspindles 16, 18 including an angle of 90° between them, each defining an angle of 45° with the indexing axis 14 and intersecting the latter and each other at one and the same point.

The same particulars apply to the axes—also indicated in dot-and-dash lines—of the measuring station 20 and of the gripper station 22, which axes define a plane extending vertically relative to the plane which is defined by the axes of the workspindles. Due to this advantageous arrangement of the spindle support 12 it is clearly possible, by rotating the spindle support through successive angles of 90° about its indexing axis 14, to put each one of the stations 16,18,20 and 22 into the very position which is occupied by workspindle 16 in FIGS. 1 and 2, that is to say into the working position of the workspindles.

The work chutes of the workspindles are shown at 26 and a workpiece 28—about to be machined or already finished—is engaged in the chuck of workspindle 16.

The measuring station 20 is equipped with a conventional sensor 30 which on touching an object issues an electrical control signal, and the gripper station 22 carries two double grippers 32,34 which are adated to engage tools.

Coaxially with the workspindle 16 or 18 which occupies the working position a hollow shaft 36 and a coreshaft 38 are mounted rotatably on the headstock 10, the core-shaft 38 extending up to a bracket 40 fixed on the headstock on which is mounted a double-acting pressure-medium actuated cylinder 42. This serves to effect a longitudinal sliding displacement of coreshaft 38, as will be more particularly described below. Belt pulleys 43 are secured to, or on the hollow shaft 36 and transmission—or driving belts 44 run over these pulleys to further belt pulleys 46 mounted on the outputshaft of a driving motor 48 by means of which the hollow shaft 36 can be driven.

In front of the spindle support 12 there is a compound- or cross-slide, comprising a bottom slide 50 and a top-slide 52, which carries a turret of the type known as a linear turret 54. This is equipped with a row of toolshafts 56 and tools 58 supported by the latter so that the tools can be displaced in a transverse direction relative to workspindle 16 in working position as well as in the longitudinal direction of the workspindle. However, the corresponding drive means for top and bottom slides 52,50 are not particularly shown.

Erected above the actual lathe is a gantry, or portal 60 which supports a traverse 62, the latter being adapted to be driven by suitable driving means, not shown, in the direction of the double-headed arrow B. A carriage 64 is adapted to be displaced along said traverse 62 in the direction of double-headed arrow C by drive means likewise not shown. This carriage 64 carries a vertically downwardly extending gripper 66 (FIG. 1) for the manipulation of tools and workpieces. In other words, the traverse 62, carriage 64 and grippers 66 together represent a manipulation unit generally designated 70, the means for actuation of the gripper 66, including rotation, lifting and lowering of this gripper, being not particularly shown because such manipulation systems are familiary to the skilled man.

Lastly FIGS. 1 and 2 also show a workpiece pallet 72 and a tool pallet 74 respectively equipped with workpieces 76 and tools 78. These workpieces and tools can be transported by means of the manipulation unit 70 to the spindle support 12 and back from the latter to the pallets.

Figure 5:
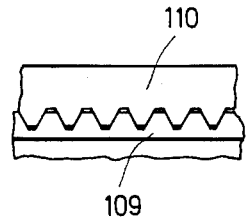
FIG. 5 shows a detail from a side elevation of plane gears which temporarily lock the spindle head in its indexing positions.

The internal construction of spindle support 12, its intermittent indexing drive and the drive of workspindles 16,18 will now be more particularly described with reference to FIGS. 3 to 5.

The hollow shaft 36 which is rotatably mounted on the head-stock 10 is provided with an adjusting spring 90 which engages in a longitudinal groove 92 of coreshaft 38 which is slidably supported in hollow shaft 36 so that the two shafts are rendered rotationally rigid whilst core shaft 38 is free to slide inside hollow shaft 36. The front end of coreshaft 38 carries one member of a clutch 94, the other clutch member being arranged at the inner end of each work-spindle 16,18. By shifting coreshaft 38 to the right, as shown in FIG. 3, the workspindle 16, or 18, which happens to occupy the working position may thus be drivingly coupled to coreshaft 38 so that it can be driven in rotation by driving motor 48. FIG. 3 however illustrates the parts in disengaged, or uncoupled position, in which spindle support 12 is rotatable about the indexing axis 14.

Figure 3:
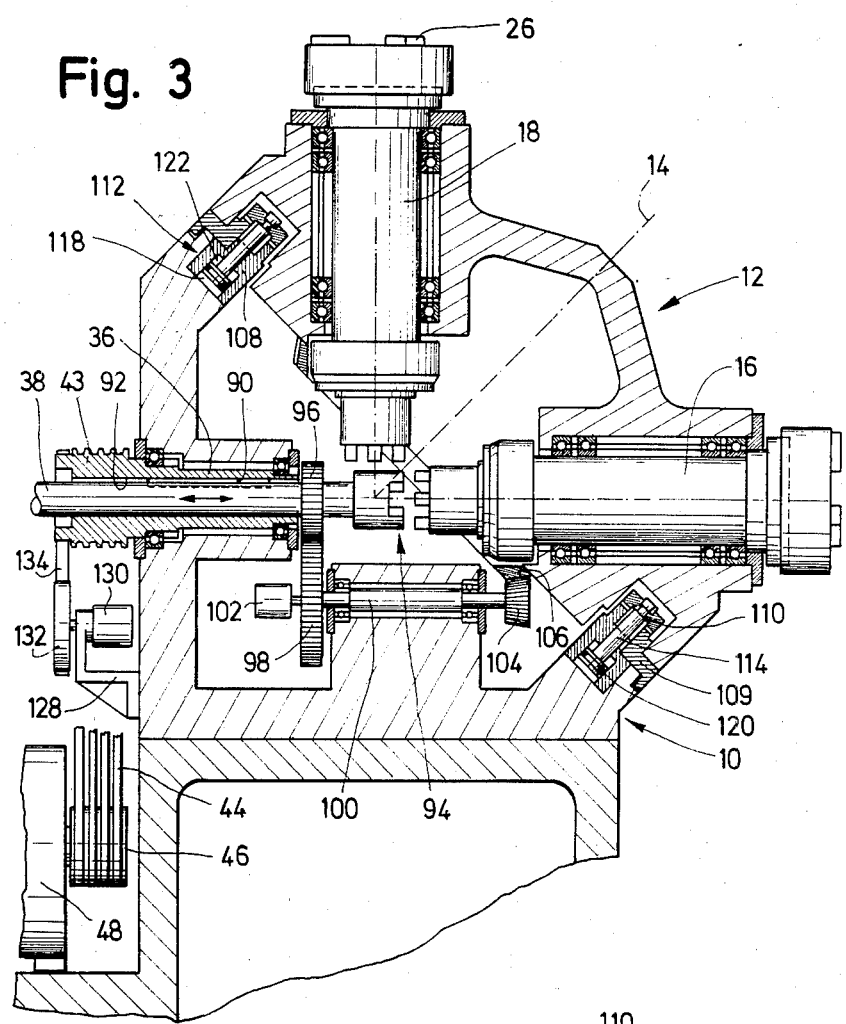
FIG. 3 is a section taken on line 3—3 in FIG. 2 through the spindle support of the automatic lathe

To this end a drive-output pinion 96 is mounted on coreshaft 38 and in mesh with a pinion 98 on a layshaft 100 when the coreshaft 38 is in a retracted position as shown in FIG. 3. The layshaft 100 is further provided with a rotation-angle pick-up 102 and with a bevel wheel 104, the latter being in constant mesh with a further bevel gear 106 which is rigidly associated with spindle support 12.

On the headstock 10 are arranged a lower ring gear 108 and a plurality of pressure-medium-actuated cylinders or jacks 112 of which the piston rods 114 support an upper ring gear 110. An external ring gear 109 which is approximately Z-shaped as viewed in cross section is fixed on spindle support 12 and adapted, by means of the upper ring gear 110 to be engaged with the stationary lower ring gear 108 and thereby prevented from rotation.

This engagement can be released by application of pressure to a lower cylinder space 118 beneath the pistons 120 of the jacks 112 (state depicted in FIG. 3) whilst pressure application to an upper cylinder space 122 enables the upper ring gear 110 to be pulled down once more thereby to lock spindle support 12 fast on headstock 10.

It should also be noted that a further bracket 128 is provided on the rear side of headstock 10 and supports a rotation-angle-monitoring pick-up device 130 which is driven via belt-pulley 132 and belt 134 by the pulleys 43 on hollow shaft 36.

Figure 4:
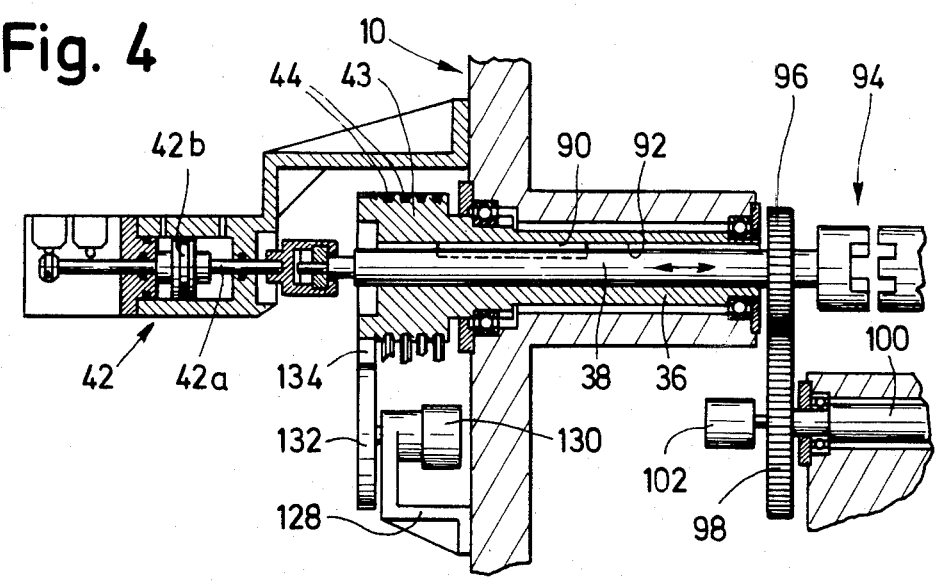
FIG. 4 is a sectional view of the means for displacing the drive shaft for the workspindles, FIG. 4 complementing FIG. 3 to the left hand side.

FIG. 4 shows the double acting, pressure-medium actuated cylinder or jack 42 which comprises a piston rod 42a with piston 42b and on which the coreshaft 38 is rotatably mounted; in the axial direction however piston rod 42a and coreshaft 38 are mutually connected as may be observed from FIG. 4.

It has already been mentioned that the automatic turret lathe according to this invention shall be a numerically controlled machine tool; control-systems for this type of machine tool are known in the art and for this reason a particular description of this system may be dispensed with.

In the state or condition of the machine tool as shown in FIGS. 3 and 4 the spindle support 12 can be rotated with the aid of driving motor 48 about indexing axis 14 and the rotation angle can be monitored and fixed by means of the pick-up 102 and the control unit—by virtue of the bevel gears 104,106 pick-up 102 is constantly phase-locked to spindle support 12. Once spindle support 12 has been moved into the desired index station it is locked on headstock 10 with the aid of the jacks 112. If one of workspindles 16,18 is situated in front of coreshaft 38 this may be pushed to the right, as viewed in FIG. 3 by means of jack 42 so that clutch 94 will be engaged. In order to make sure that the clutch members will properly engage with one another the pick-up 130 and machine control unit may be used to pre-set a specified angular position of coreshaft 38. On sliding displacement of core shaft 38 to the right hand side as viewed in FIG. 3, that is to say on engagement of clutch 94, the core shaft 38 is also isolated from the bevel gears 104,106 because the driven pinion 96 is displaced out of mesh with driving pinion 98. Conveniently the transmission ratio between coreshaft 38 and bevel wheel 104 is selected such as to ensure that, even following rotation of spindle support 12 about axis 14 through an angle of 90° or of multiples of 90°, the claw clutch 94 can be re-engaged simply by forward displacement of coreshaft 38. It is evident from FIG. 1 to 3 that now a workpiece supported by workspindle 16 may be machined whilst the respectively other workspindle 18 which extends vertically upwards and is no longer inside the working space of the machine can be discharged with the aid of manipulator unit 70, that is to say a finished workpiece is taken of and a new workpiece fitted in this latter spindle. But, with the aid of a slightly modified manipulator unit this period in working time could also be used to take a used tool out of one of grippers 32,24 and insert a new tool in the respective other gripper. In actual fact, this could also be achieved with the aid of the manipulator unit 70 shown in FIGS. 1 and 2 subject to a positional change-over on spindle support 12 of gripper station 22 and workspindle 18.

I claim:

1. A multispindle automatic turret lathe including in combination, a headstock, a spindle support, means mounting said spindle support on said headstock for rotation about a central indexing axis, a plurality of workspindles, means mounting said workspindles on said support for rotation around respective axes which intersect said indexing axis at a common point of intersection, said workspindles being movable into a working position by rotation of the spindle support, a drive shaft having an axis of rotation, means mounting said drive shaft in said headstock for rotation about said drive shaft axis, a main driving motor to rotate said drive shaft, control means to control said motor including angular position control means to adjust said drive shaft to a predetermined position of angular rotation, first coupling means on the drive shaft and workspindles to couple the shaft with a workspindle which is in said working position, said first coupling means being shiftable along said drive shaft axis on a path including said common point of intersection between an engaged position in which the drive shaft is coupled with a work spindle which is in said working position and a disengaged position, means for shifting said first coupling means, second coupling means between said drive shaft and said spindle support to rotate said spindle support about said indexing axis, said first and second coupling means being rigidly interconnected so that said second coupling means is in driving engagement when said first coupling means is in said disengaged position.

2. A lathe as in claim 1 in which said drive shaft comprises a coupling shaft and means mounting said coupling shaft for sliding movement along the drive shaft axis between said engaged and disengaged positions, said drive shaft axis intersecting said common point of intersection, said second coupling means comprising a drive gear on said coupling shaft, said coupling shaft having a forward end, said first coupling means comprising a first coupling element on said forward end, each of said workspindles having a rear end, respective second coupling elements on said rear ends for cooperation with said first coupling element when said workspindles are in said working position, said second coupling means comprising a driven gear rotatable about an axis which is parallel to said drive shaft axis, said drive gear and said driven gear being in mesh with each other and said first coupling element and the second coupling element of a workspindle in said working position being disengaged when the coupling shaft is in its disengaged position, whereas in the engaged position of the coupling shaft the first coupling element and the second coupling element of a working spindle in said working position are engaged and said drive gear and said driven gear are disengaged.

3. A lathe as in claim 1 in which said second coupling means comprises a layshaft carrying said driven gear, a drive pinion on said layshaft and a ring gear on said spindle support in mesh with said drive pinion.

4. A lathe as in claim 1 in which said second coupling means comprises first gearing carried by said headstock, second gearing carried by said spindle support, a coupling gear, means mounting said coupling gear for movement between a coupling position at which it couples said first and second gearing and a release position and controllable actuating means for said coupling gear.

5. A lathe as in claim 1 including a first angle-of-rotation pickup phase-locked to said drive shaft and a second angle-of-rotation pickup phase-locked to said spindle support.

6. A lathe as in claim 2 in which said second coupling means comprises a layshaft carrying said driven gear, a drive pinion on said layshaft and a ring gear on said spindle support in mesh with said drive pinion, said lathe including a first angle-of-rotation pickup phase-locked to said drive shaft and a second angle-of-rotation pickup phase-locked to said spindle support, said second pickup being driven by said layshaft.

* * * * *